US012623866B2

(12) United States Patent
Liu et al.

(10) Patent No.: US 12,623,866 B2
(45) Date of Patent: May 12, 2026

(54) PROCESS EQUIPMENT SYSTEM OF HYDRAULIC OIL CIRCUIT BLOCKS AND AUTOMATED PRODUCTION LINE THEREOF

(71) Applicants:Qingdao University of Technology, Qingdao (CN); Qingdao Jimo Qingli intelligent manufacturing industry Research Institute, Qingdao (CN)

(72) Inventors: Dewei Liu, Qingdao (CN); Changhe Li, Qingdao (CN); Aiguo Qin, Qingdao (CN); Yusuf Suleiman Dambatta, Kaduna (NG); Xin Cui, Qingdao (CN); Mingzheng Liu, Qingdao (CN); Teng Gao, Qingdao (CN); Zecheng Zhang, Qingdao (CN); Wenhao Xu, Qingdao (CN); Hanqi Fan, Qingdao (CN); Junting Li, Qingdao (CN)

(73) Assignees: Qingdao University of Technology, Qingdao (CN); Qingdao Jimo Qingli intelligent manufacturing industry Research Institute, Qingdao (CN)

( * ) Notice: Subject to any disclaimer, the term of this patent is extended or adjusted under 35 U.S.C. 154(b) by 328 days.

(21) Appl. No.: 18/430,692

(22) Filed: Feb. 2, 2024

(65) Prior Publication Data

US 2025/0145395 A1 May 8, 2025

(30) Foreign Application Priority Data

Nov. 3, 2023 (CN) ........................ 202311459022.X

(51) Int. Cl.
B25B 11/00 (2006.01)
B65G 57/112 (2006.01)

(52) U.S. Cl.
CPC .................................. B65G 57/112 (2013.01)

(58) Field of Classification Search
CPC ........... B25B 11/00; B25B 11/02; B25B 5/00; B25B 5/04; B25B 5/061; B23Q 3/00; B23Q 3/06
See application file for complete search history.

(56) References Cited

U.S. PATENT DOCUMENTS 6,299,151 B1 * 10/2001 Smith .................. B23Q 1/0018
269/900
6,886,820 B1 * 5/2005 Hausler, III ........... B25B 5/062
269/24

(Continued)

FOREIGN PATENT DOCUMENTS

CN 103434848 B 7/2015
CN 110805586 A 2/2020
(Continued)

*Primary Examiner* — Lee D Wilson
(74) *Attorney, Agent, or Firm* — True Shepherd LLC; Andrew C. Cheng

(57) ABSTRACT

A process equipment system of hydraulic oil circuit blocks and an automated production line thereof, which relates to the field of mechanical processing technology. In view of the problem of low production efficiency in the positioning and processing of hydraulic oil circuit blocks, based on the six-point positioning principle, the workpiece is achieved the six-point positioning by the support components, positioning devices, and clamping devices on the upper layer of the base. The clamping device is capable to move along the chain, so as to adjust and change the clamping position, and can achieve processing five surfaces through one-time clamping of oil circuit blocks, improving positioning accuracy and processing efficiency, meeting the needs of automated production.

10 Claims, 14 Drawing Sheets

(56) References Cited

U.S. PATENT DOCUMENTS

| | | | |
|---|---|---|---|
| 11,243,522 B2 | 2/2022 | Cella et al. | |
| 11,256,243 B2 | 2/2022 | Gray et al. | |
| 11,733,665 B2 | 8/2023 | Gray et al. | |
| 2005/0242482 A1* | 11/2005 | Nakata | B23K 37/0435 |
| | | | 269/32 |
| 2013/0334753 A1* | 12/2013 | Stanifer | B23Q 3/069 |
| | | | 29/559 |
| 2016/0136789 A1* | 5/2016 | Fukui | B25B 5/003 |
| | | | 269/152 |
| 2016/0151869 A1* | 6/2016 | Dohi | B23Q 1/525 |
| | | | 269/139 |
| 2025/0145395 A1* | 5/2025 | Liu | B23Q 3/069 |

FOREIGN PATENT DOCUMENTS

| | | |
|---|---|---|
| CN | 213052838 U | 4/2021 |
| CN | 113953542 B | 8/2022 |

\* cited by examiner

II-1 II-2

II-3 II-4 II-4-1 II-4-2 II-5

II-1-6

II-1-1

II-1-7

II-1-4

II-1-11

II-1-3

I-1

II-1-10

II-1-2

II-1-8

II-1-9

II-1-5

Z

X

II-1-11-1

II-1-11-2

II-2-1  II-2-1

II-2-1  II-2-1

I-2-4

I-2-5

I-2-6

I-2-7

I-2-10　　　　　I-2-1-2　　　I-2-2

I-2-8　　I-2-1-3　　　　　　　I-2-1-1

I-2-9-5

I-2-9-3

I-2-9-4

I-2-9-2

I-2-9-1

I-2-9-4

I-2-9-3

I-2-9-2

I-2-9-1

I-2-9-5

I-2-1

PROCESS EQUIPMENT SYSTEM OF HYDRAULIC OIL CIRCUIT BLOCKS AND AUTOMATED PRODUCTION LINE THEREOF

CROSS-REFERENCE TO RELATED APPLICATIONS

This application claims priority to Chinese Patent Application No. 202311459022.X with a filing date of Nov. 3, 2023. The content of the aforementioned application, including any intervening amendments thereto, is incorporated herein by reference.

TECHNICAL FIELD

The present disclosure relates to the field of mechanical processing technology, in particular to a process equipment system of hydraulic oil circuit blocks and an automated production line thereof.

BACKGROUND

Oil circuit blocks are essential components in hydraulic systems, and their machining accuracy determines the stable operation of the hydraulic system. Oil circuit block blanks are mostly square regular parts with simple machining processes. At present, the production and processing of oil circuit blocks are mostly carried out by manually operated machine tools, using simple positioning and clamping methods, and multiple positioning and clamping are required in one processing, which leads to poor machining accuracy of oil circuit blocks. Due to insufficient surface accuracy and large roundness errors in oil circuit holes, the yield rate is low. Therefore, it is imperative to achieve automated production of oil circuit blocks with high-precision positioning and processing.

The Chinese patent (public number: CN113953542B) discloses an automotive hub process equipment system and an intelligent clean and precision machining production line, mainly used for flexible production of disc parts such as hubs, and not suitable for square parts such as oil circuit blocks. The Chinese patent (public number: CN103434848B) discloses a brick stacking device, which uses a buffering device to buffer the impact force of the slider generated when the steam curing vehicle collides with the locator, it can effectively alleviate the impact force on the cylinder and extend the service life of the cylinder. However, the stacking device operates independently and requires additional loading and unloading devices, which increases additional equipment costs. The Chinese patent application (public number: CN110805586A) discloses a hydraulic oil circuit block positioning and fixing device, which can adjust the position of the oil circuit block. However, it is only suitable for the installation environment of hydraulic oil circuit blocks and cannot be adapted to the production and processing of oil circuit blocks, it cannot be used as positioning and processing equipment in the production and processing process. The Chinese patent (public number: CN213052838U) discloses a positioning mechanism for drilling hydraulic oil circuit blocks, which solves the technical difficulties of positioning and adjusting during the drilling process of oil circuit blocks by setting a turntable, a locking mechanism, an auxiliary positioning mechanism, a first shaft rod, and an irregular groove. However, it can only be applied in the field of oil circuit block drilling, and the fixture needs to be replaced when milling the surface of oil circuit blocks, which is difficult to meet the demand for multiple processing methods for oil circuit blocks in flexible machining processes. In summary, the existing oil circuit block processing and production have technical bottlenecks of low efficiency and insufficient positioning and processing accuracy, and known technologies cannot achieve automated production of oil circuit blocks, and it is difficult to meet the processing efficiency and accuracy requirements of oil circuit blocks.

SUMMARY

The objective of the present disclosure is to provide a process equipment system of hydraulic oil circuit blocks and an automated production line thereof that addresses the deficiency of existing technology. Based on the six-point positioning principle, the workpiece is achieved six-point positioning by a support component, a positioning device, and a clamping device on the upper layer of the base. The clamping device is capable to move along the chain, so as to adjust and change the clamping position, and achieve the processing of five surfaces through one-time clamping of the oil circuit block, which improves positioning accuracy and processing efficiency, and meets the needs of automated production.

The first objective of the present disclosure is to provide a process equipment system of hydraulic oil circuit blocks, adopting the following solution:

A process equipment system of hydraulic oil circuit blocks, including:

a base, wherein the base includes an upper layer and a lower layer of the base arranged apart;

a support component, wherein the support component is used to support a bottom surface of an oil circuit block;

a positioning device, wherein there are two sets of the positioning devices, the sets of the positioning devices are arranged corresponding to a set of diagonal positions of the oil circuit block, and each set of the positioning devices is capable to simultaneously abut against two adjacent sides of the oil circuit block;

a clamping device, wherein the clamping device includes a hollow-square guide rail installed on the upper layer of the base, a slider installed on the guide rail, and a clamping mechanism installed on the slide rail; an outer side of the guide rail is matched with a hollow-square chain through tensioning wheels, the slide rail is provided with a motor, and an output end of the motor is engaged with the chain through a sprocket to drive the slider to slide along the guide rail and adjust a working position of the clamping mechanism.

Further, the support component is arranged on the upper layer of the base, including at least three first support nails, and all tops of the first support nails are coplanar, serving as a bearing surface for common contact and bearing of the oil circuit block.

Further, each set of the positioning devices comprises two sets of second support nails, each set of second support nails connected to a same telescopic mechanism through guide rods, the telescopic mechanism drives the second support nails to move back and forth relative to the upper layer of the base to switch contact states between the second support nails and the side of the oil circuit block.

Further, each set of the second support nails includes at least three second support nails, at least two second support nails in the same set are abutted against one side of the oil circuit block, and the other second support nails in the same set are abutted against the adjacent other side of the oil circuit block.

Further, tensioning wheels are installed on the upper layer of the base outside corner positions of the guide rail, and the chain sequentially cooperates with the tensioning wheels to form an enclosed return structure.

Further, the upper layer of the base is provided with brake blocks at edge positions of the guide rail, and the adjacent edge brake blocks of the guide rail serve as a sliding interval of one slider.

Further, the clamping mechanism comprises a clamp and a cylinder, the clamp is installed on the slider through a shaft to form a lever structure, the cylinder is rotationally connected to one end of the slider, and the other end forms a pressing part in contact with a top surface of the oil circuit block.

Further, the clamping mechanism is provided with two sets, and the two sets of clamping mechanisms are installed on one set of opposite sides of the hollow-square guide rail.

The third objective of the present disclosure is to provide an automated production line of hydraulic circuit blocks, utilizing the hydraulic circuit block process equipment system as described in the first objective, including an oil circuit block loading and unloading system, a robot, and machining centers; two of the machining centers are placed opposite each other, the robot is fixedly installed in a middle for loading and unloading, the machining centers and the robot form a machining area, and the oil circuit block loading and unloading system is arranged adjacent to the machining area.

Further, the oil circuit block loading and unloading system includes an loading and unloading platform and stacking devices; the loading and unloading platform is provided with a loading position, an unloading position, and a material rack placement platform located between the loading position and the unloading position; the two stacking devices are respectively connected to the material platforms through conveyor devices, and each conveyor device is provided with loading and unloading robots;

wherein the conveying device transports the material racks to the stacking devices or takes out the material racks from the stacking devices, and the stacking devices drive the material racks after insertion and stacking to move, so as to release the material racks or stack the material racks.

Compared with related art, the advantages and positive effects of the present disclosure are shown as below:

(1) In view of the low production efficiency of hydraulic oil circuit block positioning and processing, based on the six-point positioning principle, the workpiece is achieved the six-point positioning by support components, a positioning device and a clamping device on the upper layer of the base. The clamping device is capable to move along the chain, so as to adjust and change the clamping position, and achieve the processing of five surfaces through one-time clamping of the oil circuit block, which improves positioning accuracy and processing efficiency, and meets the needs of automated production.

(2) Positioning is achieved by means of a positioning device that is positioned against the side of the oil circuit block from all sides, restricting movement in the XY direction and rotation in the Z direction, and is positioned at the bottom corner of the side of the oil circuit block to reduce the obstruction of the machining position. By using a telescopic structure, it can retract and avoid in the non-positioning state, improving clamping efficiency.

(3) The stacking device adopts a two-axis motion structure to achieve lifting or lowering of the stacked material. The conveying device serves as an intermediate transition structure and can temporarily support the material rack to meet the needs of adjusting the position of the clamp, achieving stacking and unloading.

(4) The automated production line for hydraulic oil circuit blocks includes the process equipment system, the oil circuit block loading and unloading system, the robot, the machining center, and the protective fence, achieving automated production of oil circuit blocks, improving production efficiency, and liberating manpower. The oil circuit block loading and unloading system automates the loading and unloading and stacking height of the automated production line of oil circuit blocks through centering and lifting operations.

BRIEF DESCRIPTION OF THE DRAWINGS

The accompanying drawings of the specification, which form a part of the present disclosure, are used to provide a further understanding of the present disclosure. The illustrative embodiments and their illustrations of the present disclosure are used to illustrate the present disclosure and do not constitute an improper limitation of the present disclosure.

In the figure, process equipment system I, oil circuit block loading and unloading system II, robot III, machining center IV, and protective fence V;

oil circuit block I-1;

base I-2-1, tensioning wheel I-2-2, chain I-2-3, clamp I-2-4, cylinder I-2-5, motor I-2-6, sprocket I-2-7, brake block I-2-8, positioning device I-2-9, guide rail I-2-10;

the upper layer of the base I-2-1-1, support nail I-2-1-2, and through hole I-2-1-3;

cylinder I-2-9-1, flange I-2-9-2, guide rod I-2-9-3, spring I-2-9-4, support nail I-2-9-5;

stacking device II-1, loading and unloading robot II-2, conveying device II-3, loading and unloading platform II-4, and material rack placement platform II-5;

Z-axis ball screw II-1-1, X-axis ball screw II-1-2, outer frame II-1-3, guide rod II-1-4, X-axis guide rail II-1-5, Z-axis guide rail II-1-6, Z-axis slider II-1-7, installation base II-1-8, X-axis slider II-1-9, bearing bracket II-1-10, material rack II-1-11, stacking platform II-1-12, base II-1-13;

support column II-1-11-1 and support nail II-1-11-2;

installation bracket II-3-1, Y-axis guide rail II-3-2, cylinder II-3-3, Y-axis slider II-3-4, and bearing platform II-3-5;

installation base II-2-1, cylinder II-2-2, slider II-2-3, and clamp II-2-4.

DETAILED DESCRIPTION OF THE EMBODIMENTS

Embodiment 1

In a typical embodiment of the present disclosure, as shown in FIG. 9 to FIG. 14, a process equipment system of hydraulic oil circuit blocks is provided.

Figure 9:
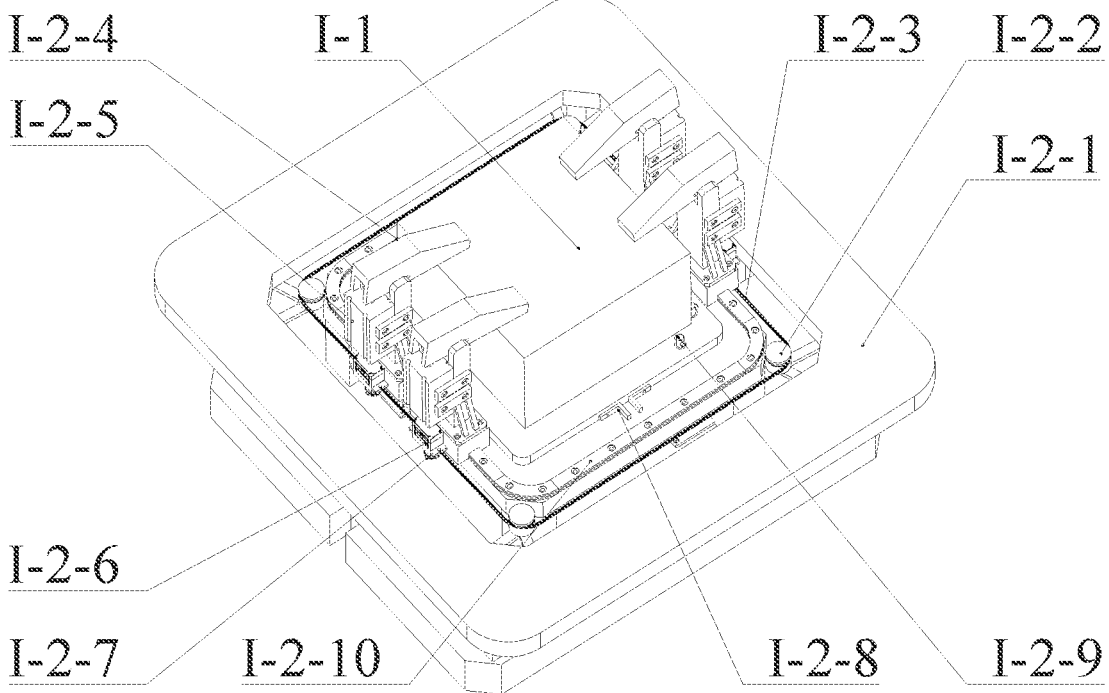
FIG. 9 is an axonometric diagram of the oil circuit block process equipment system in Embodiment 1 or 2 of the present disclosure.

As shown in FIG. 9, the process equipment system of hydraulic oil circuit blocks mainly includes an oil circuit fixture. The oil circuit fixture includes a base I-2-1, a tensioning wheel I-2-2, a chain I-2-3, a clamp I-2-4, a cylinder I-2-5, a motor I-2-6, a sprocket I-2-7, a brake block I-2-8, a positioning device I-2-9, and a guide rail I-2-10. Wherein, the tensioning wheel I-2-2, the chain I-2-3, the guide rail I-2-10, and the positioning device I-2-9 are installed on the base I-2-1. The guide rail I-2-10 and the chain I-2-3 are both in a hollow-square shape, with the chain I-2-3 arranged around the outer side of the guide rail I-2-10, and the chain I-2-3 are arranged apart from the guide rail I-2-10.

Figure 10:
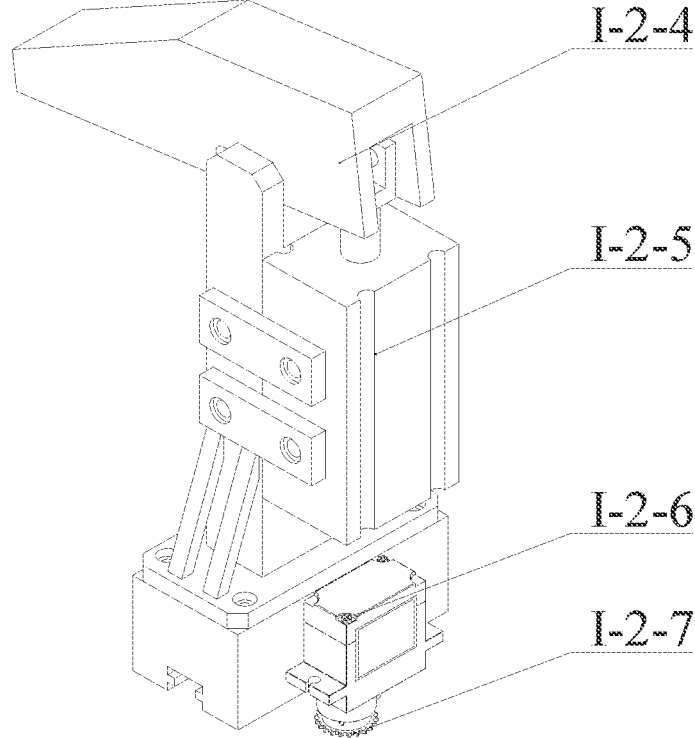
FIG. 10 is an axonometric diagram of the oil circuit block clamping device in Embodiment 1 or 2 of the present disclosure.

As shown in FIG. 10, the cylinder I-2-5, the motor I-2-6, and the clamp I-2-4 are installed on the slider carried by the guide rail I-2-10. The sprocket I-2-7 is connected to the main shaft of motor I-2-6 and meshes with the chain I-2-3. Specifically, the positioning device I-2-9 limits the degree of freedom of the workpiece, and the cylinder I-2-5 installed on the slider of guide rail I-2-10 drives the clamp I-2-4 to press against the surface of the workpiece. The motor I-2-6 installed on the slider carried by guide rail I-2-10 drives the sprocket I-2-7 to move the slider along guide rail I-2-10, thereby driving the cylinder I-2-5 and the clamp I-2-4 installed on the slider to move. The brake block I-2-8 is used to achieve mechanical braking and positioning of the slider.

Figure 11:
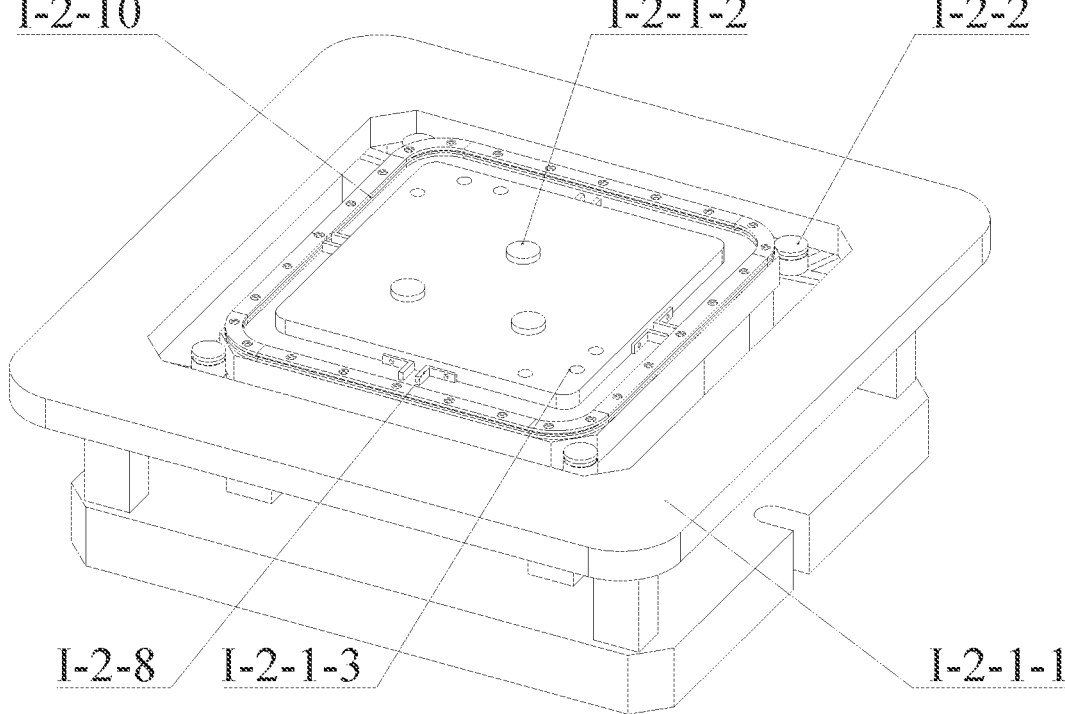
FIG. 11 shows the axonometric diagram of the oil circuit block base in Embodiment 1 or 2 of the present disclosure.

As shown in FIG. 11, the base I-2-1 has two layers, and the upper layer of the base I-2-1 is a hollowed structure used to install the tensioning wheel I-2-2 and the chain I-2-3, while preventing chip residue.

The support component supports the bottom surface of the workpiece, and the support component is arranged on the upper layer of the base, including at least three first support nails. The top of all first support nails is coplanar, serving as the bearing surface for common contact and bearing of the workpiece. In this embodiment, the first support nails are three support nails I-2-1-2 installed at the center position of I-2-1-1 on the upper layer of the base, used for workpiece positioning, mainly limiting the movement of the workpiece along the Z-axis and the rotation of the X and Y axes. The upper layer I-2-1-1 of the base has through holes I-2-1-3 for installing the positioning device I-2-9. There are two sets of through holes I-2-1-3 arranged diagonally, with a total of three in each set. Two through holes I-2-1-3 in the same set are used to install the positioning device I-2-9 for contacting one side of the workpiece, and another through hole I-2-1-3 in the same set is worked with the installed positioning device I-2-9 for contacting adjacent sides.

Figure 12:
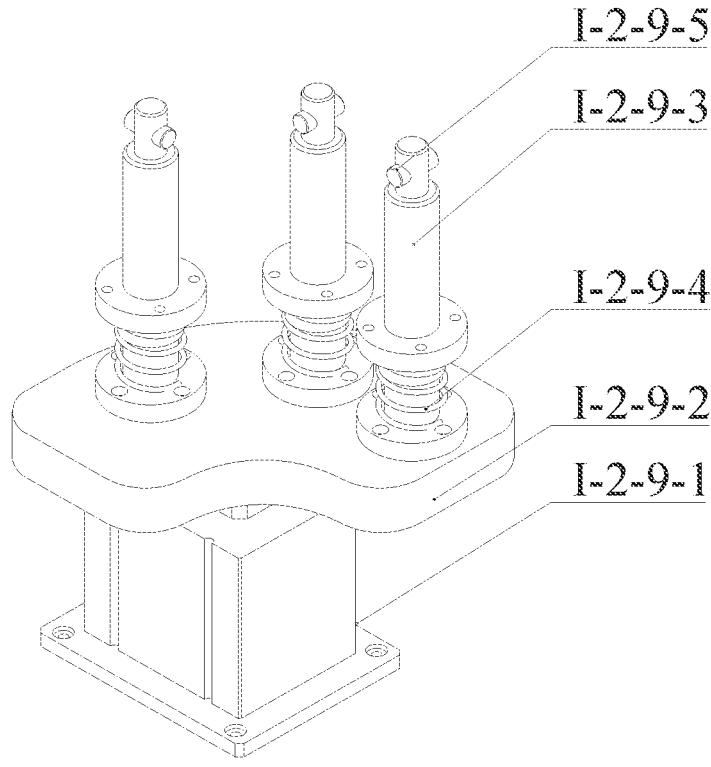
FIG. 12 is an axonometric diagram of the oil circuit block positioning device in Embodiment 1 or 2 of the present disclosure.
Figure 13:
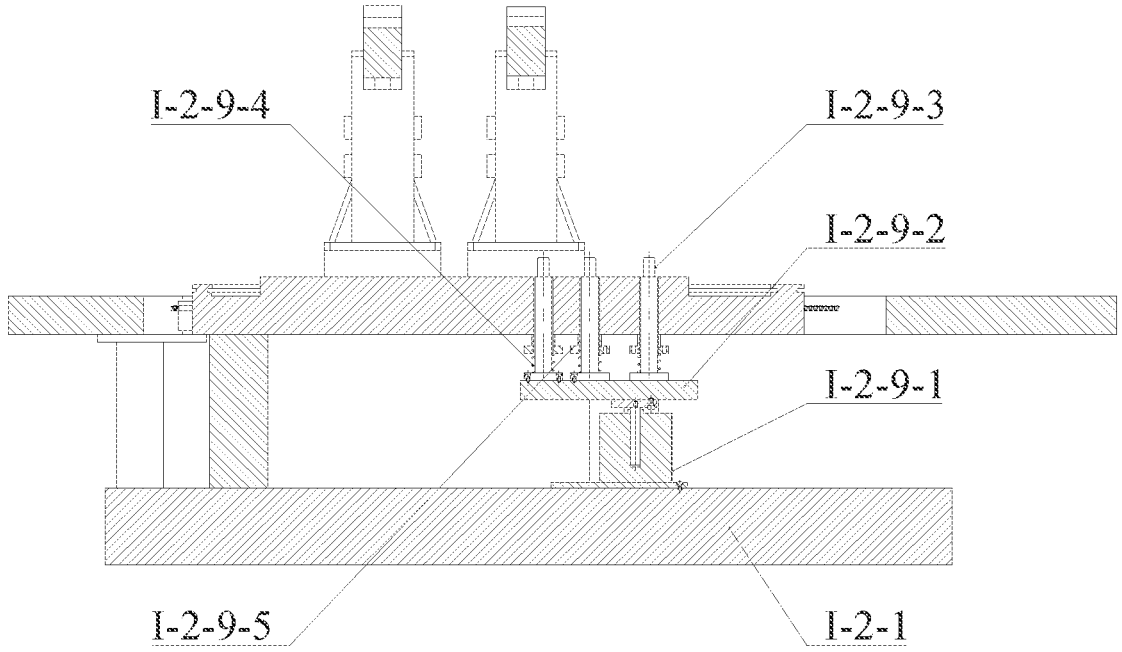
FIG. 13 is a sectional view of the installation of the oil circuit block positioning device in Embodiment 1 or 2 of the present disclosure.

As shown in FIG. 12 and FIG. 13, the positioning device I-2-9 includes a cylinder I-2-9-1, a flange I-2-9-2, a guide rod I-2-9-3, a spring I-2-9-4, and a support nail I-2-9-5. Wherein, the support nail I-2-9-5 is the second support nail, and the cylinder I-2-9-1 is installed on the lower layer of the base I-2-1. The piston rod of the cylinder I-2-9-1 is fixedly connected to the flange I-2-9-2, and a spring I-2-9-4 is installed between the flange I-2-9-2 and the guide rod I-2-9-3 for resetting and buffering. The guide rod I-2-9-3 is equipped with the support nail I-2-9-5 for positioning the workpiece. There are two identical positioning devices I-2-9 arranged, each of which matches a set of through holes I-2-1-3. The two positioning devices I-2-9 are arranged at diagonal position on the base I-2-1.

Specifically, the lower surface of the workpiece is the main positioning base, and the three support nails I-2-1-2 installed on the upper layer I-2-1-1 of the base limit the movement of the workpiece along the Z-axis and the rotation of the X and Y axes. The cylinder I-2-9-1 drives the guide rod I-2-9-3 to extend, and the support nails I-2-9-5 on the two guide rods I-2-9-3 limit the movement of the workpiece along the X-axis and the rotation of the Z-axis. The support nails I-2-9-5 on one guide rod I-2-9-3 limit the movement of the workpiece along the Y-axis, which is a complete positioning manner.

After positioning is completed, the positioning device I-2-9 located on the processing surface of the current workpiece, and the guide rod I-2-9-3, driven by the cylinder I-2-9-1 and the spring I-2-9-4, descend into the through hole I-2-1-1 on the upper layer of the base, while the positioning device I-2-9 located diagonally extends to position the workpiece under the drive of the cylinder I-2-9-1.

The cylinder I-2-5 and the clamp I-2-4 form a clamping mechanism. The cylinder I-2-5 installed on the slider carried by the guide rail I-2-10 drives the clamp I-2-4 to press onto the surface of the workpiece. At this time, the workpiece is clamped tightly, and the machining center IV processes the two sides and upper areas of the workpiece that are not clamped by the clamp I-2-4. After the machining is completed, the cylinder I-2-5 drives the clamp I-2-4 to loosen, and the motor I-2-6 installed on the slider of the guide rail I-2-10 drives the sprocket I-2-7 to drive the slider to move along the guide rail I-2-10, thereby driving the cylinder I-2-5 and the clamp I-2-4 installed on the slider to move. The clamp I-2-4 is moved to the machined side of the workpiece and re-clamp the machined side. At this point, the machining center IV processes the remaining two sides and upper areas of the workpiece that not clamped by clamp I-2-4. In this way, processing of five surfaces through one-time clamping of the workpiece are achieved.

Figure 14:
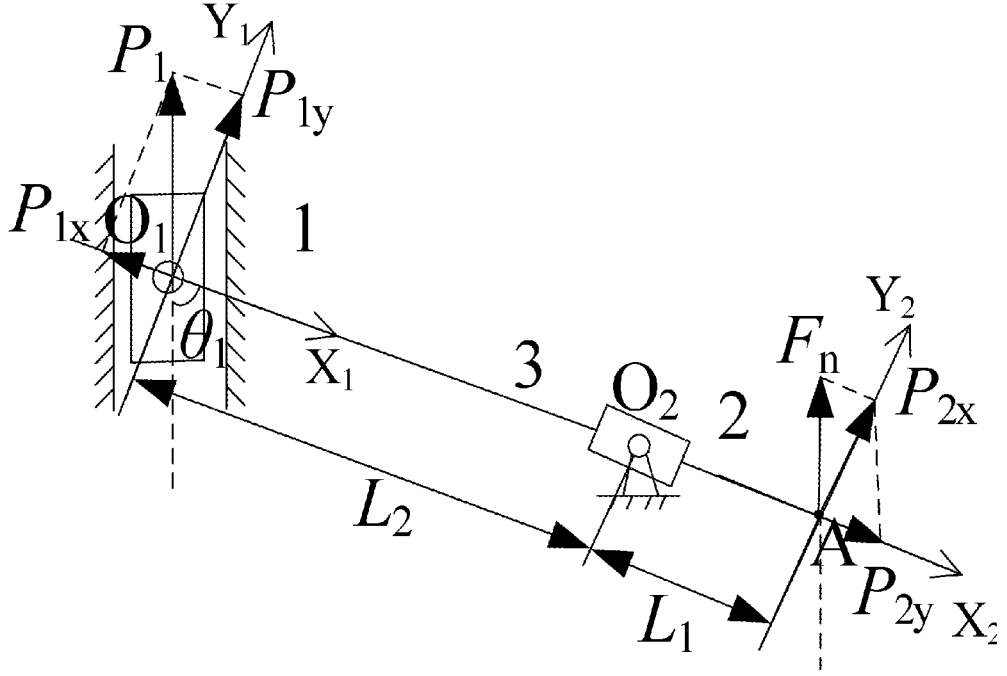
FIG. 14 is a schematic diagram and force analysis of the mechanism of the oil circuit block clamping device in Embodiment 1 or 2 of the present disclosure.

Clamping Reliability Analysis:

The clamping device consists of the cylinder I-2-5 and the clamp I-2-4. FIG. 14 shows the schematic diagram and force analysis of the mechanism of the clamping device. Assuming that the tangential contact force between the workpiece and the fixture components that does not slide relative to each other during the milling process is M, and the position of the workpiece relative to the fixture does not change during the machining process, there are:

$$F_{n,min} = \frac{M_{max}}{\mu} - G \qquad (1)$$

In the formula, $F_{n \cdot min}$ is the minimum clamping force, N; $M_{max}$ is the maximum tangential contact force, N; G is the gravity of the workpiece, N; $\mu$ is the frictional coefficient;

According to the torque balance at point O2, it can be inferred that:

$$P_{1y}L_2 = P_{2x}L_1 \qquad (2)$$

In the formula, $P_{1y}$ is the force perpendicular to the rod direction applied by a component 1 to a component 3, N; $L_2$ is the distance between $O_1$ and $O_2$, mm; $P_{2x}$ is the force perpendicular to the rod direction applied by the workpiece to the component 3, N; $L_1$ is the distance between $O_2$ and point A, mm.

According to the force relationship and geometric relationship, the minimum thrust $P_{1,min}$ applied by the cylinder I-1-4-5 should satisfy:

$$P_{1,min} = \frac{F_{n,min}L_1}{NL_2} \qquad (3)$$

In the formula, $\theta_1$ is the angle between the component 3 and the vertical direction, °; N is the number of clamping devices.

Embodiment 2

In another typical embodiment of the present disclosure, as shown in FIG. 1 to FIG. 14, an automated production line is provided.

Figure 1:
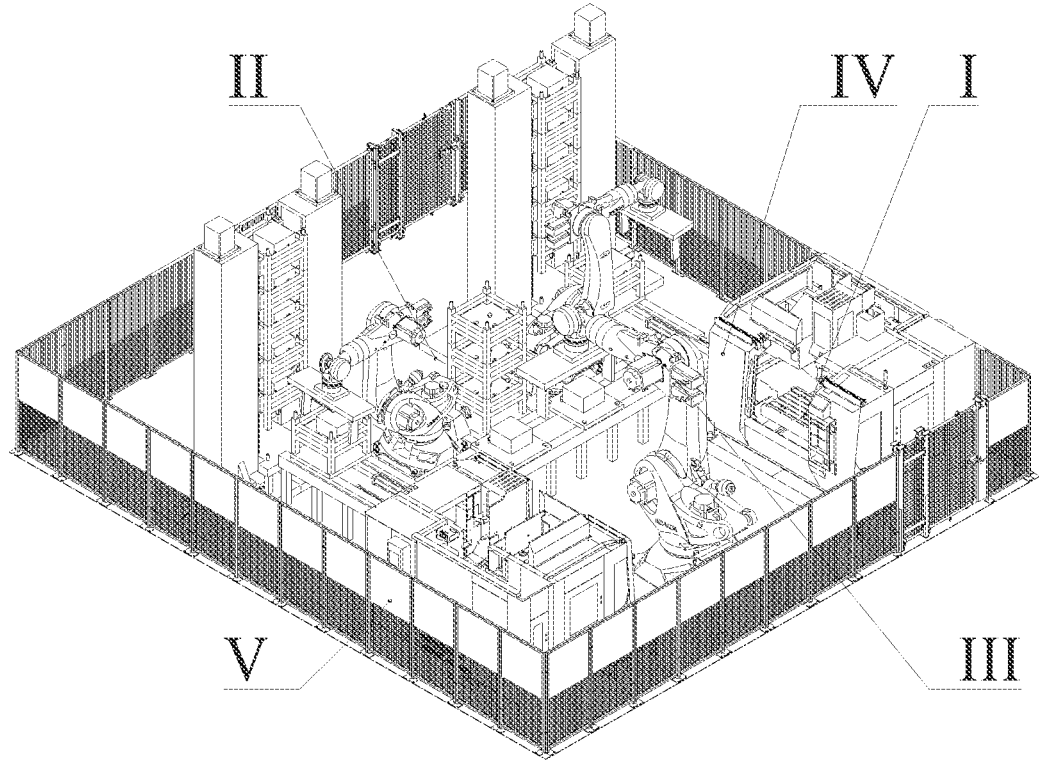
FIG. 1 is an axonometric diagram of the automated production line for oil circuit blocks in Embodiment 2 of the present disclosure.

As shown in FIG. 1, an automated production line for oil circuit blocks includes: a process equipment system I, an oil circuit block loading and unloading system II, a robot III, machining centers IV, and protective fences V. Wherein the process equipment system I can adopt the process equipment system of hydraulic oil circuit blocks as shown in Embodiment 1. Two machining centers IV are placed opposite each other, and a fixed robot III is installed in the middle for loading and unloading. The machining centers IV and the robot III form the machining area. The machining area is adjacent to the oil circuit block loading and unloading system II, and the protective fences V surrounds the machining area and the oil circuit block loading and unloading system II.

Specifically, the process equipment system I is used for positioning and clamping of oil circuit blocks. The structure of process equipment system I is shown in FIG. 9 to FIG. 14, which has been explained in detail in Embodiment 1 and will not be described here for brevity. The oil circuit block loading and unloading system II is used for loading and unloading and stacking oil circuit blocks. The robot III is used to transport oil circuit blocks between the process equipment system I and the oil circuit block loading and unloading system II. The machining centers IV are used for processing and production. The protective fences V are used to protect the safety of equipment and operators.

Figure 2:
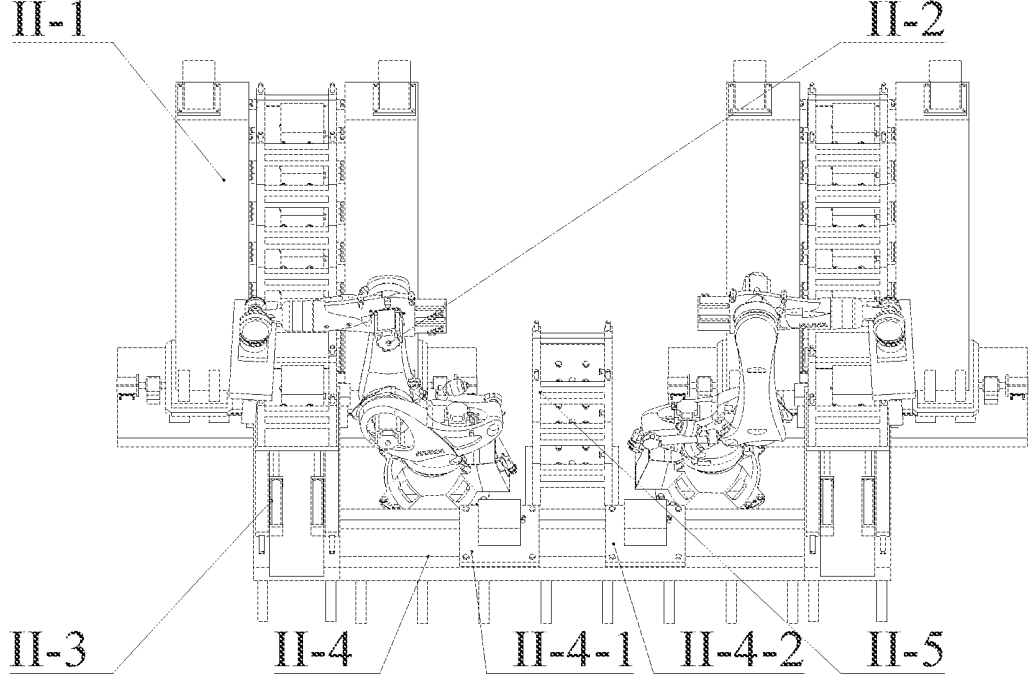
FIG. 2 is an axonometric diagram of the oil circuit block loading and unloading system in Embodiment 2 of the present disclosure.

As shown in FIG. 2, the oil circuit block loading and unloading system II includes: a stacking device II-1, a loading and unloading robot II-2, a conveying device II-3, a loading and unloading platform II-4, and a material rack placement platform II-5. Wherein, the conveying device II-3 is aligned with the axis of the stacking device II-1, the loading and unloading robot II-2 is placed on one side of the conveying device II-3, the loading and unloading platform II-4 is horizontally placed, and its end is aligned with the conveying device II-3.

The loading and unloading platform II-4 is equipped with a loading position II-4-1 and an unloading position II-4-2, which are respectively used to place workpieces to be loaded and workpieces to be unloaded. The longitudinal axis of the above unloading platform II-4 is the symmetry axis, and two stacking devices II-1, two loading and unloading robots II-2, and two conveying devices II-3 are symmetrically installed. At the same time, the loading and unloading platform II-4 is also symmetrical relative to the central axis. The stacking device II-1, the loading and unloading robot II-2, the conveying device II-3, and partial loading and unloading platform II-4 located on one side of the aforementioned symmetry axis are used for loading, while the stacking device II-1, the loading and unloading robot II-2, the conveying device II-3, and partial loading and unloading platform II-4 located on the other side of the aforementioned symmetry axis are used for unloading. The material rack placement platform II-5 is installed in the middle of the loading and unloading platform II-4, and the central axis of the material rack placement platform II-5 coincides with the symmetry axis of the loading and unloading platform II-4.

Specifically, during loading, the stacking device II-1 located on one side of the symmetry axis is used to stack and sequentially place batch unprocessed oil circuit blocks II-1-12 and their material racks I-1-11 onto the conveying device II-3. The loading and unloading robot II-2 is used to separate the oil circuit block II-1-12 and material rack I-1-11 on the conveying device II-3, and transport the material rack I-1-11 to the material rack placement platform II-5, and transport the oil circuit blocks II-1-12 to the loading position II-4-1.

When unloading, the loading and unloading robot II-2 located on the other side of the symmetry axis is used to send the material rack I-1-11 on the material rack placement platform II-5 to the conveying device II-3, and place the processed oil circuit block II-1-12 on the material rack I-1-11 to complete the positioning. The conveying device II-3 transports the oil circuit block II-1-12 and its material rack I-1-11 to the stacking device II-1, and then the stacking device II-1 performs the stacking operation.

Figure 3:
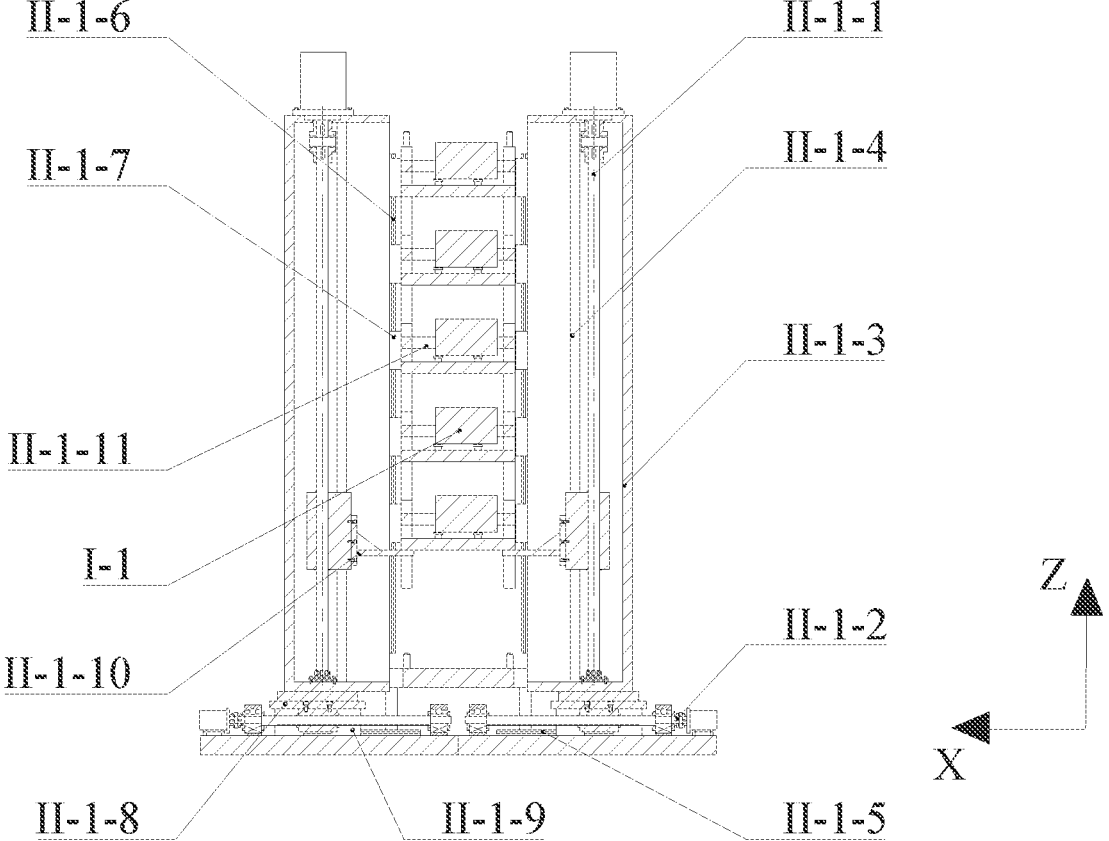
FIG. 3 is a sectional view of the stacking device of the oil circuit block loading and unloading system in Embodiment 2 of the present disclosure.
Figure 4:
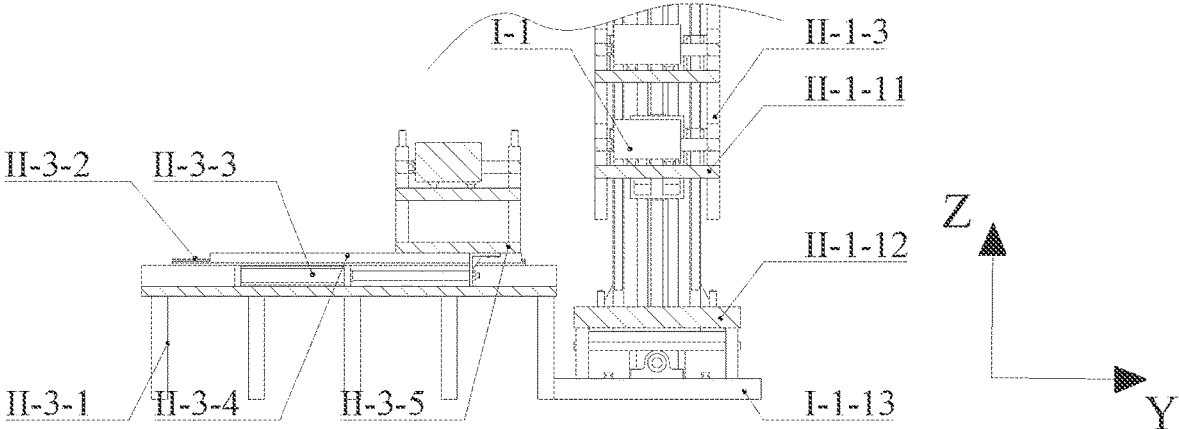
FIG. 4 is a sectional view of the conveying device of the oil circuit block loading and unloading system in Embodiment 2 of the present disclosure.
Figure 5:
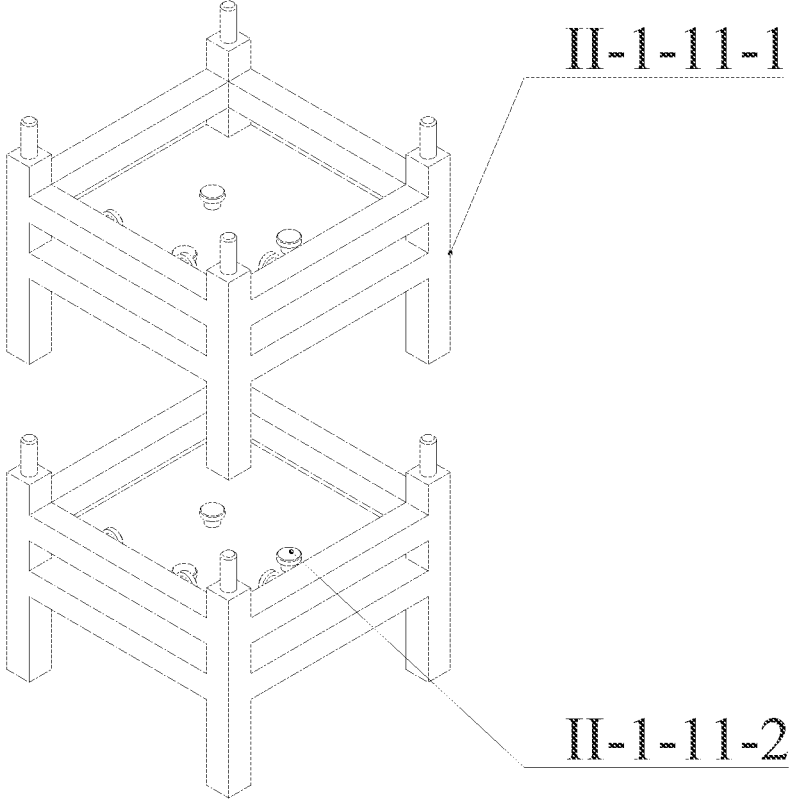
FIG. 5 is an exploded view of the material rack assembly of the oil circuit block loading and unloading system in Embodiment 2 of the present disclosure.

As shown in FIG. 3, FIG. 4, and FIG. 5, the stacking device II-1 includes: a Z-axis ball screw II-1-1, a X-axis ball screw II-1-2, an outer frame II-1-3, a guide rod II-1-4, a X-axis guide rail II-1-5, a Z-axis guide rail II-1-6, a Z-axis slide II-1-7, an installation base II-1-8, a X-axis slider II-1-9, a bearing bracket II-1-10, a material rack II-1-11, a stacking platform II-1-12, and a base II-1-13.

Wherein, the X-axis ball screw II-1-2 is installed on the base II-1-13, the X-axis ball screw II-1-2 is symmetrically installed on both sides of the X-axis guide rail II-1-5, the X-axis slider II-1-9 is installed on the X-axis guide rail II-1-5, the installation base II-1-8 is fixedly installed on the slider of the X-axis ball screw II-1-2 and the X-axis slider II-1-9, the outer frame II-1-3 is fixed on the installation base II-1-8, the Z-axis ball screw II-1-1 is installed on the outer frame II-1-3, and its driving motor is installed on the top of the outer frame II-1-3. The Z-axis ball screw II-1-1 is fixedly installed with the bearing bracket II-1-10 on the slider, and its length can extend out of the outer frame II-1-3.

The Z-axis guide rail II-1-6 is symmetrically fixed on the right side of the outer frame II-1-3 along the central axis. Z-axis slider II-1-7 is installed on the guide rail, and rubber pads are installed on the surface of Z-axis slider II-1-7. The above components constitute the left side part of the stacking device II-1. The above components are symmetrically installed using the side line of the right side of the base as the axis of symmetry, forming the right side part of the stacking device II-1. The stacking device II-1 is symmetrically installed using the side line of the right side of the base II-1-13 as the axis of symmetry.

Two bases II-1-13 are fixedly installed with stacking platform II-1-12 in the center. The support nails I-1-11-2 are arranged on the material rack II-1-11 according to the six-point positioning principle, wherein three support nails I-1-11-2 are installed on the bottom, two support nails I-1-11-2 are installed on the side, and one support nail I-1-11-2 is installed on the adjacent side.

The four support columns I-1-11-1 of the material rack I-1-11 have fixed installation pin shafts on the upper surface, and deep holes are set on the lower surface. When stacking, the pin shafts of the material rack I-1-11 located below are in clearance fit with the deep holes of the support columns I-1-11-1 located above, so that the lower surface of the support columns I-1-11-1 located above the material rack II-1-11 coincides with the upper surface of the support columns I-1-11-1 located below the material rack II-1-11.

The conveying device II-3 includes: an installation bracket II-3-1, a Y-axis guide rail II-3-2, a cylinder II-3-3, a Y-axis slider II-3-4, and a bearing platform II-3-5. Two Y-axis guide rails II-3-2 are fixedly installed on the installation bracket II-3-1 with the symmetry axis of the installation bracket. The Y-axis guide rails II-3-2 are equipped with Y-axis sliders II-3-4, and the Y-axis slider has a certain length. The bearing platform II-3-5 is fixedly connected to the Y-axis slider II-3-4, and four pin shafts are fixedly installed in a rectangular shape on the bearing platform II-3-5, which can achieve clearance fit with the deep holes on the bottom surface of the material rack. The cylinder II-3-3 is fixedly installed on the installation bracket II-3-1, and the piston rod of the cylinder II-3-3 is fixedly connected to the bearing platform II-3-5. The cylinder II-3-3 can drive the bearing platform II-3-5 to move to the middle of the stacking device II-1.

Figure 6:
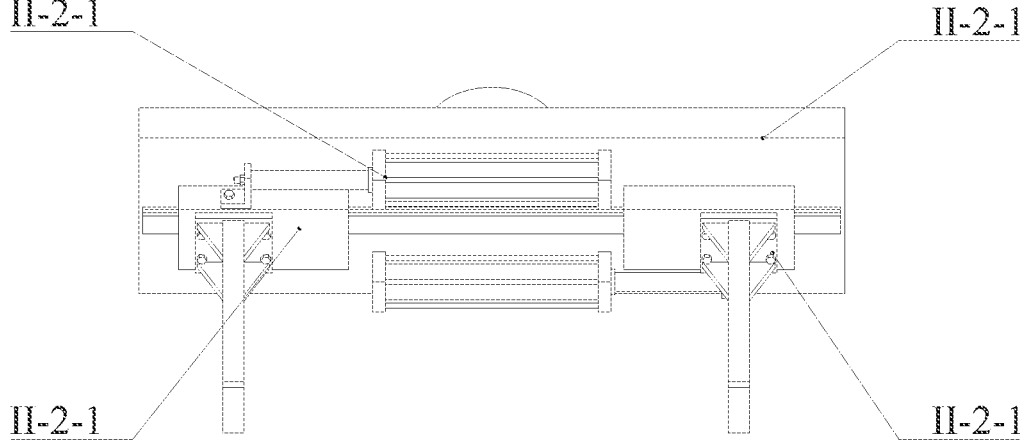
FIG. 6 is an axonometric diagram of the manipulator of the robot of the oil circuit block loading and unloading system in Embodiment 2 of the present disclosure.

As shown in FIG. 6, the manipulator parts of the loading and unloading robot II-2 and the robot III include an installation base II-2-1, a cylinder II-2-2, a slider II-2-3, and a clamp II-2-4. The installation base II-2-1 fixes the linear guide rail along the centerline. The slider II-2-3 is installed on the linear guide rail, and the clamp II-2-4 is installed on the slider. The slider II-2-3 is driven by the cylinder II-2-2, which is fixedly installed on the installation base II-2-1.

Figure 7:
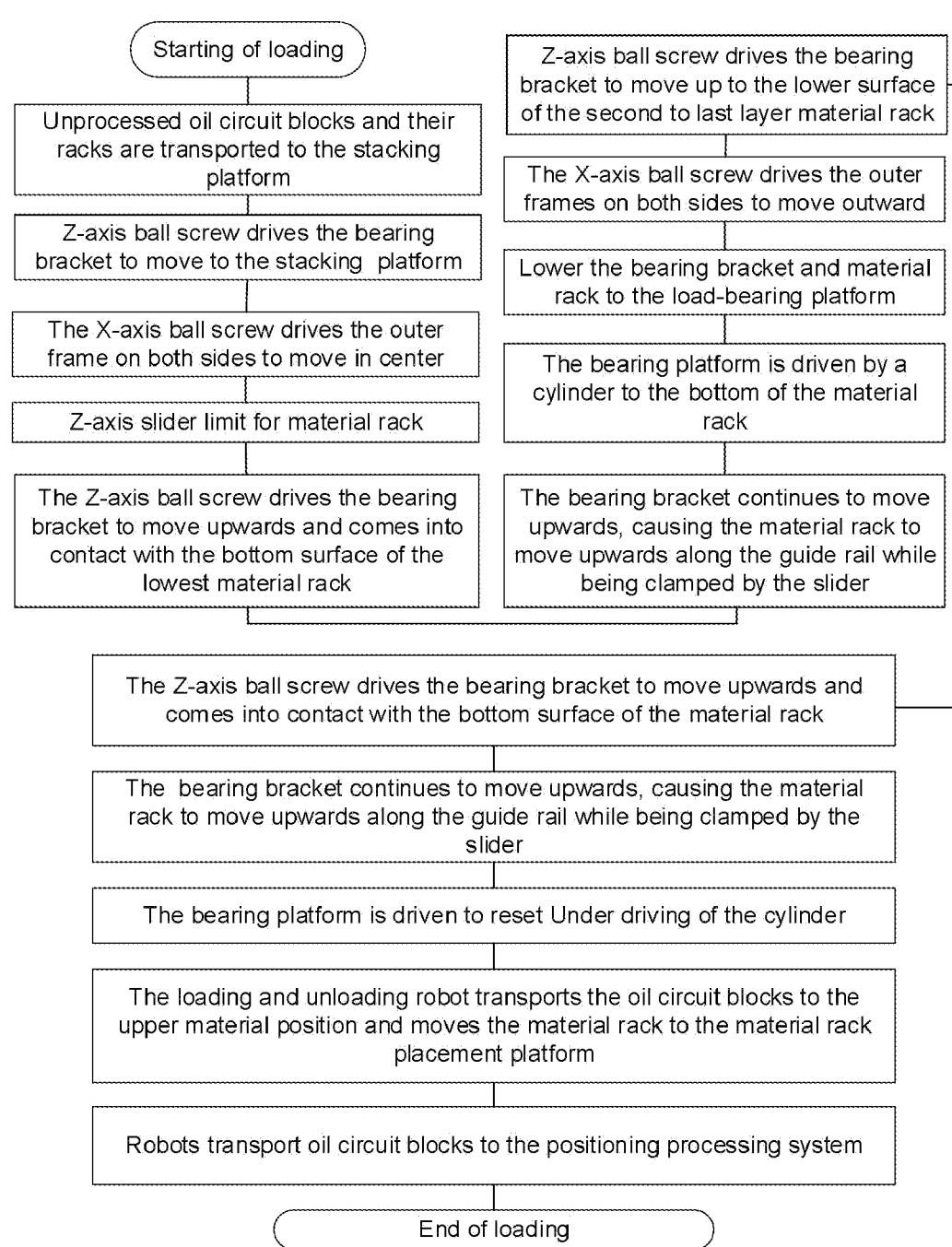
FIG. 7 is the loading process diagram of the oil circuit block loading and unloading system in Embodiment 2 of the present disclosure.

As shown in FIG. 7, the specific workflow of the oil circuit block loading and unloading system II during the loading operation includes:

When performing the loading operation, the unprocessed oil circuit block I-1 and its material rack II-1-11 are transported to the stacking platform II-1-12, and the Z-axis ball screw II-1-1 drives the bearing bracket II-1-10 to move to the stacking platform II-1-12. The specific height range is between the bottom surface of the lowest layer of material rack II-1-11 and the top of the stacking platform II-1-12. The X-axis ball screw II-1-2 drives the outer frame II-1-3 on both sides to move in the center. At this time, the Z-axis slider II-1-7 limits the material rack II-1-11. Next, the Z-axis ball screw II-1-1 drives the bearing bracket II-1-10 to move upward and come into contact with the bottom surface of the lowest layer material rack II-1-11. The Z-axis ball screw II-1-1 drives the bearing bracket II-1-10 to continue moving up, and the material rack II-1-11 and the oil circuit block I-1 move up along the Z-axis guide rail II-1-6 under the lifting of the bearing bracket II-1-10. The bearing platform II-3-5 is driven directly below the material rack II-1-11 by cylinder II-3-3, the lowering of the bearing bracket II-1-10 causes the deep holes of the four support columns I-2-11-1 on the lowest layer of material frame II-1-11 to fit with the clearance of the four pin shafts on the bearing platform II-3-5.

The X-axis ball screw II-1-2 drives the outer frames II-1-3 on both sides to move outward, while the Z-axis ball screw II-1-1 drives the bearing bracket II-1-10 to move up between the bottom surface of the second to last layer material frame II-1-11 and the top surface of the first to last layer material frame II-1-11. The Z-axis ball screw II-1-1 drives the bearing bracket II-1-10 to move up and make contact with the bottom surface of the material rack II-1-11. The bearing bracket II-1-10 continues to move up, lifting the material rack II-1-11 and the oil circuit block I-1. The bottom material rack II-1-11 and the oil circuit block I-1 remain on the bearing platform II-35, and the cylinder II-3-3 drives the bearing platform II-3-5 to reset. The loading and unloading robot II-2 transports the oil circuit block I-1 to the loading position II-4-1, and transports the material rack II-1-11 to the material rack placement platform, the robot III transports the oil circuit block I-1 to the process equipment system I, at this moment, the loading is completed. And start the next round of loading according to the requirements.

Figure 8:
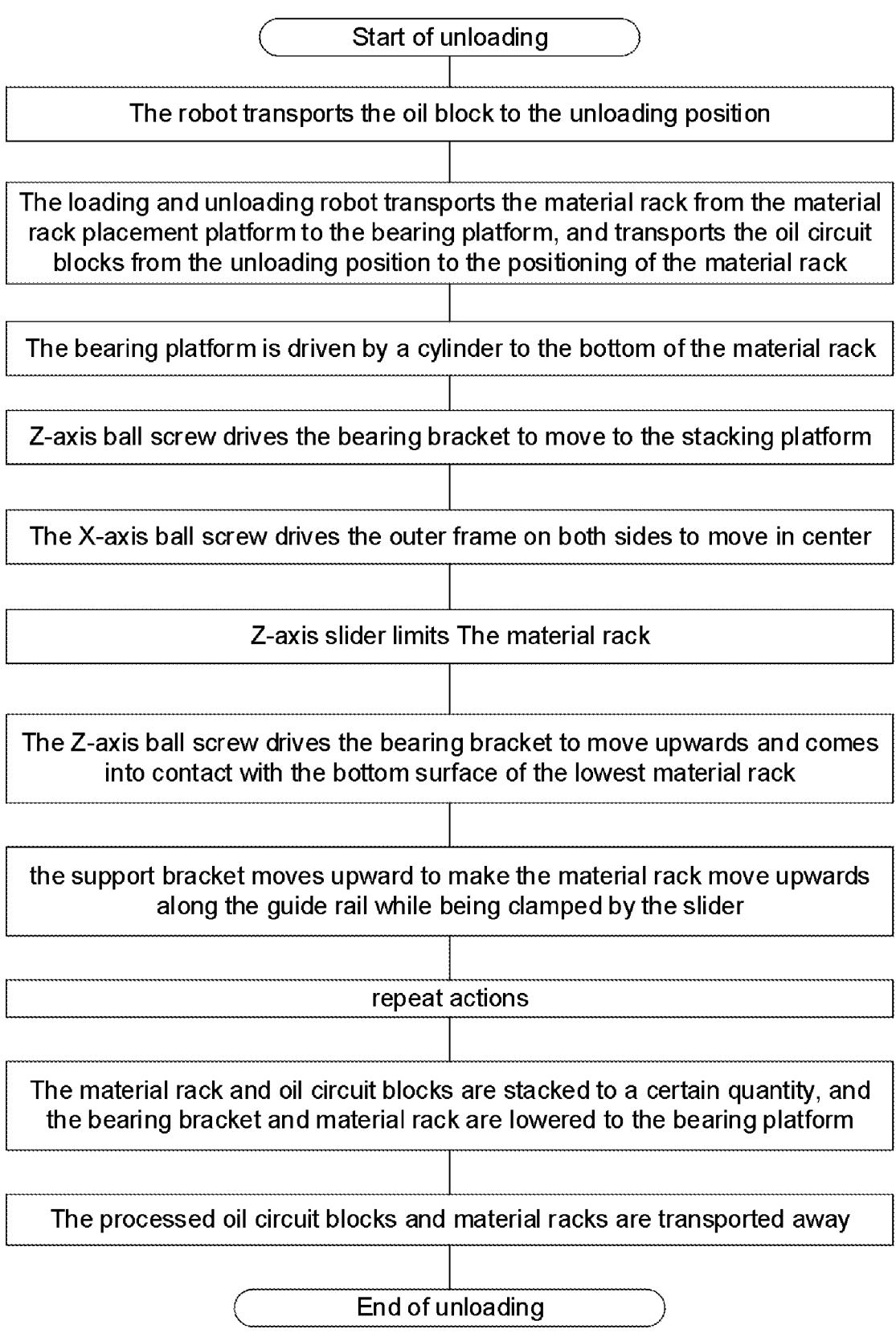
FIG. 8 is the unloading process diagram of the oil circuit block loading and unloading system in Embodiment 2 of the present disclosure.

As shown in FIG. 8, the specific workflow of the oil circuit block loading and unloading system II during the unloading operation includes:

The robot transports the oil circuit block I-1 to the unloading position II-4-2, and the loading and unloading robot II-2 transports the material rack II-1-11 from the material rack placement platform II-5 to the bearing platform II-3-5, and transports the oil circuit block I-1 from the unloading position II-4-2 to the material rack II-1-11 for positioning. The bearing platform II-3-5 is driven by the cylinder II-3-3 to the middle position of the stacking device II-1. The Z-axis ball screw II-1-1 drives the bearing bracket II-1-10 to move between the upper surface of the bearing platform II-3-5 and the lower surface of the material rack. The X-axis ball screw II-1-2 drives the outer frame on both sides to move in the center. The Z-axis slider II-1-7 limits the material rack II-1-11, and the Z-axis ball screw II-1-1 drives the bearing bracket II-1-10 to move upward and make contact with the bottom surface of the lowest material rack II-1-11. The bearing bracket II-1-10 is moved up, causing the material rack II-1-11 to move up along the Z-axis guide rail II-1-6. The system determines whether the preset stacking quantity has been reached. If not, the above operation is repeated. If the preset stacking quantity is reached, the bearing bracket II-1-10 lowers the material rack II-1-11 to the stacking platform II-1-12, and the processed oil circuit block I-1 and the material rack II-1-11 are transported away to complete the unloading.

The above is only preferred embodiments of the present disclosure and is not intended to limit it. For those skilled in the art, the present disclosure may have various modifications and variations. Any modifications, equivalent substitutions, improvements, etc. made within the spirit and principles of the present disclosure shall be included within the scope of the present disclosure.

What is claimed is:

1. A process equipment system of hydraulic oil circuit blocks, comprising:
   a base, wherein the base comprises an upper layer and a lower layer of the base arranged apart;
   a support component, wherein the support component is used to support a bottom surface of an oil circuit block;
   a positioning device, wherein there are two sets of the positioning devices, the sets of the positioning devices are arranged corresponding to a set of diagonal positions of the oil circuit block, and each set of the positioning devices is capable to simultaneously abut against two adjacent sides of the oil circuit block;
   a clamping device, wherein the clamping device comprises a hollow-square guide rail installed on the upper layer of the base, a slider installed on the guide rail, and a clamping mechanism installed on the slide rail; an outer side of the guide rail is matched with a hollow-square chain through tensioning wheels, the slide rail is provided with a motor, and an output end of the motor is engaged with the chain through a sprocket to drive the slider to slide along the guide rail and adjust a working position of the clamping mechanism.

2. The process equipment system of hydraulic oil circuit blocks according to claim 1, wherein the support component is arranged on the upper layer of the base, comprising at least three first support nails, and all tops of the first support nails are coplanar, serving as a bearing surface for common contact and bearing of the oil circuit block.

3. The process equipment system of hydraulic oil circuit blocks according to claim 1, wherein each set of the positioning devices comprises two sets of second support nails, each set of second support nails connected to a same telescopic mechanism through guide rods, the telescopic mechanism drives the second support nails to move back and forth relative to the upper layer of the base to switch contact states between the second support nails and the side of the oil circuit block.

4. The process equipment system of hydraulic oil circuit blocks according to claim 3, wherein each set of the second support nails comprises at least three second support nails, at least two second support nails in the same set are abutted against one side of the oil circuit block, and the other second support nails in the same set are abutted against the adjacent other side of the oil circuit block.

5. The process equipment system of hydraulic oil circuit blocks according to claim 1, wherein tensioning wheels are installed on the upper layer of the base outside corner positions of the guide rail, and the chain sequentially cooperates with the tensioning wheels to form an enclosed return structure.

6. The process equipment system of hydraulic oil circuit blocks according to claim 1, wherein the upper layer of the base is provided with brake blocks at edge positions of the guide rail, and the adjacent edge brake blocks of the guide rail serve as a sliding interval of one slider.

7. The process equipment system of hydraulic oil circuit blocks according to claim 1, wherein the clamping mechanism comprises a clamp and a cylinder, the clamp is installed on the slider through a shaft to form a lever structure, and the cylinder is rotationally connected to one end of the slider, while the other end forms a pressing part in contact with a top surface of the oil circuit block.

8. The process equipment system of hydraulic oil circuit blocks according to claim 7, wherein the clamping mechanism is provided with two sets, and the two sets of clamping mechanisms are installed on one set of opposite sides of the hollow-square guide rail.

9. An automated production line of hydraulic circuit blocks utilizing the hydraulic circuit block process equipment system according to claim 1, comprising an oil circuit block loading and unloading system, a robot, and machining centers; two of the machining centers are placed opposite each other, the robot is fixedly installed in a middle for loading and unloading, the machining centers and the robot form a machining area, and the oil circuit block loading and unloading system is arranged adjacent to the machining area.

10. The automated production line of hydraulic circuit blocks according to claim 9, wherein the oil circuit block loading and unloading system comprises an loading and unloading platform and stacking devices; the loading and unloading platform is provided with a loading position, an unloading position, and a material rack placement platform located between the loading position and the unloading position; the two stacking devices are respectively connected to the material platforms through conveyor devices, and each conveyor device is provided with loading and unloading robots;
   wherein the conveying device transports the material racks to the stacking devices or takes out the material racks from the stacking devices, and the stacking devices drive the material racks after insertion and stacking to move, so as to release the material racks or stack the material racks.

* * * * *